(12) United States Patent
Karamanev

(10) Patent No.: US 7,687,161 B2
(45) Date of Patent: Mar. 30, 2010

(54) METHOD FOR GENERATING ELECTRICITY

(75) Inventor: Dimitre Gueorguiev Karamanev, Ontario (CA)

(73) Assignee: The University of Western Ontario, London (CA)

( * ) Notice: Subject to any disclaimer, the term of this patent is extended or adjusted under 35 U.S.C. 154(b) by 0 days.

(21) Appl. No.: 12/457,449

(22) Filed: Jun. 11, 2009

(65) Prior Publication Data

US 2010/0035089 A1 Feb. 11, 2010

Related U.S. Application Data

(62) Division of application No. 10/562,198, filed as application No. PCT/CA2004/000943 on Jun. 25, 2004, now Pat. No. 7,572,546.

(60) Provisional application No. 60/482,765, filed on Jun. 27, 2003.

(51) Int. Cl.
H01M 8/16 (2006.01)
H01M 8/10 (2006.01)
H01M 8/20 (2006.01)
H01M 8/06 (2006.01)

(52) U.S. Cl. .............................. 429/2; 429/101; 429/43; 429/30; 429/19

(58) Field of Classification Search .................. 429/2
See application file for complete search history.

(56) References Cited

U.S. PATENT DOCUMENTS

| 3,331,705 | A | 7/1967 | Davis |
| 5,763,259 | A | 6/1998 | Panos |
| 6,214,088 | B1 | 4/2001 | Karamanev |
| 6,270,649 | B1 | 8/2001 | Zeikus et al. |
| 6,495,023 | B1 | 12/2002 | Zeikus |
| 6,589,772 | B1 | 7/2003 | Banfield et al. |
| 6,696,184 | B1 | 2/2004 | Christian et al. |
| 2003/0049511 | A1* | 3/2003 | Ritts et al. ................. 429/33 |
| 2008/0044721 | A1* | 2/2008 | Heller et al. ............... 429/43 |

FOREIGN PATENT DOCUMENTS

EP 62256382 * 9/1987

(Continued)

OTHER PUBLICATIONS

Microbial communities in acid mine drainage, Baker at al, 2003, FEMS Microbiology Ecology 44 (2), 139-152.

(Continued)

*Primary Examiner*—Patrick Ryan
*Assistant Examiner*—Brent Thomas
(74) *Attorney, Agent, or Firm*—Lynn C. Schumacher; Hill & Schumacher

(57) ABSTRACT

The present invention discloses a method of generating electricity which uses a new type of biofuel cell. The method is based on the microbial regeneration of the oxidant, ferric ions. The bio-fuel cell is based on the cathodic reduction of ferric to ferrous ions, coupled with the microbial regeneration of ferric ions by the oxidation of ferrous ions, with fuel (such as hydrogen) oxidation on the anode. The microbial regeneration of ferric ions is achieved by chemolithotrophic microorganisms such as *Acidithiobacillus ferroxidans*. Electrical generation is coupled with the consumption of carbon dioxide from atmosphere and its transformation into microbial cells, which can be used as a single-cell protein.

16 Claims, 11 Drawing Sheets

FOREIGN PATENT DOCUMENTS

| | | |
|---|---|---|
| JP | 62256382 | 11/1987 |
| JP | 62256382 A * | 11/1987 |
| JP | 2006012773 | 1/2006 |
| KR | 3052789 | 3/2003 |
| WO | WO 01/04061 | 1/2001 |
| WO | WO 2005/001981 | 1/2005 |

OTHER PUBLICATIONS

Micromachining of metals using microorganism, Uno et al, Materia Japan (Japan), vol. 37, No. 1, pp. 52-54, 1998.

Electricity generation using an air cathode single chamber Microbial fuel cell in the presence and absence of a proton exchange membrane, Login at al, Environ. Sci, Technol., Jun. 12, 2004.

Microbial fuel cell using Anaaeroblc respiration as an Anodic reaction and bilmineralized manganese as a cathodic reactant, Lewandowdki et al, Environ. Sci. Technol 2005, 39, 4666-4671, May 14, 2005.

International Search Report for PCT/CA2004/000943, 6 pages (PCT/ISA/210).

Written Opinion for PCT/CA2004/000943, 8 pages (PCT/ISA/237).

International Preliminary Report for PCT/CA2004/000943, 1 page (PCT/IB/373).

Notification Concerning Transmittal of International Preliminary Report, 1 page (PCT/IB/326).

* cited by examiner

METHOD FOR GENERATING ELECTRICITY

CROSS REFERENCE TO RELATED U.S. PATENT APPLICATIONS

This application is a Divisional application of U.S. patent application Ser. No. 10/562,198 entitled BIOFUEL CELL filed on May 16, 2006 in the name of the same inventors, which is a National Phase application claiming the benefit of PCT/CA2004/000943 filed on Jun. 25, 2004; which further claims the benefit of priority from U.S. patent application Ser. No. 60/482,765 filed on Jun. 27, 2003, entitled BIOFUEL CELL, which application was filed in English, all of which are incorporated herein by reference in their entirety.

FIELD OF THE INVENTION

The present invention relates to a fuel cell, and more particularly the present invention relates to a bio-fuel cell based on the microbial regeneration of the oxidant, ferric ions, by the process of aerobic oxidation of ferrous to ferric ions by chemolithotrophic microorganisms such as *Acidithiobacillus ferroxidans* that eliminates carbon dioxide from the atmosphere during electricity generation.

BACKGROUND OF THE INVENTION

A major component of the development of a hydrogen economy is the wide scale adoption of fuel cell technology. While there have been significant advances towards the application of fuel cells in everyday life, their widespread use has not been achieved yet due in part to the high cost of electricity they produce, see Rose, R., Fuel Cells and Hydrogen: The Path Forward, *Report Prepared for the Senate of the USA*, http://www.fuelcellpath.org.

The slow kinetics of the oxygen reduction reaction on the cathode of the most popular proton-exchange membrane (PEM) hydrogen-oxygen fuel cell is the main reason for both the high cost of the fuel cell itself (requirement of Pt as catalyst) and of low electrical fuel efficiency, around 50% as disclosed in Bockris, J. O.-M. and R. Abdu, *J. Electroanal. Chem.*, 448, 189 (1997).

The use of redox fuel cells, in which oxygen is replaced by other oxidants, such as ferric ions, can result in the increase of the rate of cathodic reaction (or exchange current density in electrochemical terms) by several orders of magnitude, as disclosed in Bergens, S. H., G. B. Gorman, G. T. R. Palmore and G. M. Whitesides, *Science*, 265, 1418 (1994); Larsson, R. and B. Folkesson, *J. Appl. Electrochem.*, 20, 907 (1990); and Kummer, J. T. and D.-G. Oei, *J. Appl. Electrochem.*, 15, 619 (1985).

In addition, the rate of mass transfer of oxidant to the electrode surface (corresponding to limiting current density in electrochemical terms) is also higher, mainly because of the higher aqueous solubility of the oxidant in redox fuel cells (for example, 50 g/L for $Fe^{3+}$) as compared to that of oxygen (between 0.006 and 0.04 g/L, depending on the partial pressure and temperature). All these characteristics of the redox fuel cells should theoretically allow efficiencies for the transformation of chemical to electrical energy of 80 to 90% to be achieved using non-noble metal electrodes based on thermodynamic arguments. However, the main problem in redox fuel cells is the efficiency of reoxidation of the reduced form of the oxidant (oxidant regeneration), see Larsson, R. and B. Folkesson, *J. Appl. Electrochem.*, 20, 907 (1990); and Kummer, J. T. and D.-G. Oei, *J. Appl. Electrochem.*, 15, 619 (1985).

For example, γ-ray irradiation has been used for the reoxidation of $Fe^{2+}$ to $Fe^{3+}$ in a $H_2$—$Fe^{3+}/Fe^{2+}$ redox fuel cell as disclosed in Yearger, J. F, R. J. Bennett and D. R. Allenson, *Proc. Ann. Power Sources Conf.*, 16, 39 (1962). While the efficiency of the fuel cell itself was very high, the reported efficiency of the oxidant regeneration was well below 15%. In other cases, regeneration of the oxidant is carried out using oxygen over expensive catalyst [see Bergens, S. H., G. B. Gorman, G. T. R. Palmore and G. M. Whitesides, *Science*, 265, 1418 (1994)] which eliminates the advantage of the use of non-platinum cathode, and is still slow.

Therefore, in order to develop a practically viable redox fuel cell with high overall efficiency, it is necessary to develop an efficient method for oxidant regeneration as suggested in Larsson, R. and B. Folkesson, *J. Appl. Electrochem.*, 20, 907 (1990).

The process of aerobic oxidation of ferrous to ferric ions by chemolithotrophic microorganisms such as *Acidithiobacillus ferroxidans* (*A. ferroxidans*) was discovered more than half a century ago, see A. R. Colmer, M. E. Hinkle, Science, 106 (1947) 253-256. These microorganisms have been widely used in metallurgy for the leaching of noble (Au), heavy (U) and base (Cu, Ni, Zn, Co) metals, as well as in environmental protection. The microbial iron oxidation is based on the following net reaction:

$$4Fe^{2+}+4H^{+}+O_2=4Fe^{3+}+2H_2O \qquad (1)$$

It has been shown that the rate of microbial oxidation of ferrous ions is 500,000 times faster than that obtained by purely chemical reaction with oxygen at pH between 1 and 2, see D. T. Lacey, F. Lawson, Biotechnology and Bioengineering, 12 (1970) 29-50.

When growing on ferrous iron oxidation, *A. ferroxidans* uses one of the narrowest thermodynamic limits known in microbial world, see W. J. Ingledew, Biochimica et Biophysica Acta, 683 (1982) 89-117. The electron transport chain of iron oxidation by this microorganism contains two half-reactions:

$$4Fe^{2+}=4Fe^{3+}+4e^{-} \qquad (2)$$

which takes place outside of the cell membrane, and

$$4e^{-}+O_2+4H^{+}=2H_2O \qquad (3)$$

inside of the membrane, see M. Nemati, S. T. L. Harrison, G. S. Hansford, C. Webb, Biochemical Engineering Journal, 1 (1998) 171-190. The electrons are transported through the cell wall via a chain of three electron carriers—rusticyanin, cytochrome c and cytochrome a.

The iron-oxidizing bacterium *A. ferroxidans* is an autotrophic microorganism, i.e. it uses carbon dioxide ($CO_2$), usually from atmosphere, as a sole source of carbon, while inorganic reactions such as ferrous iron oxidation (1-3) supply it with energy. The laboratory- pilot- and industrial-scale oxidation of iron by *A. ferroxidans* has been studied in different types of bioreactors. Under the usual cultivation conditions in a bioreactor containing *A. ferroxidans* grown on ferrous ions, the redox potential can reach a value of 1000 mV, see M. Boon, K. C. A. M. Luyben, J. J. Heijnen, Hydrometallurgy, 48 (1998) 1-26. Since the potential of reaction (3) is 1120 mV vs. standard hydrogen electrode (SHE), up to approx. 90% of the reaction energy is used for the production of Fe3+, while the rest (~10%) is available to microorganisms for biomass formation and maintenance.

The biooxidation of ferrous iron by *A. ferroxidans* has been used in electrochemical cells for several different purposes. In all these cases, the electrochemical reaction, taking place on the surface of the cathode is:

$$Fe^{3+} + e^- = Fe^{2+} \quad (4)$$

Several different counter-electrode (anode) reactions have been described:

A) Oxygen formation according to the reaction:

$$2H_2O = 4e^- + O_2 + 4H^+ \quad (5a)$$

In that case, it is necessary to apply external electrical potential in order to reduce the ferric iron on one electrode and to produce oxygen on the other. This system has been used for the continuous regeneration of the microbial substrate (ferrous iron) which resulted in the production of very high cell yields, see N. Matsumoto, S. Nakasono, N. Ohmura, H. Saiki, Biotechnology and Bioengineering, 64 (1999) 716-721; and S. B. Yunker, J. M. Radovich, Biotechnology and Bioengineering, 28 (1986) 1867-1875.

B) Oxidation of ferric ions:

$$Fe^{2+} = Fe^{3+} + e^- \quad (5b)$$

This type of electrobioreactor has been used to determine the rate of microbial ferrous iron oxidation by measuring the value of the electrical current, see H. P. Bennetto, D. K. Ewart, A. M. Nobar, I. Sanderson, Charge Field Eff. Biosyst.—2, [Proc. Int. Symp.], (1989) 339-349; and K. Kobayashi, K. Ibi, T. Sawada, Bioelectrochemistry and Bioenergetics, 39 (1996) 83-88.

C) Oxidation of organic compounds such as methanol:

$$CH_3OH + H_2O = CO_2 + 6H^+ + 6e^- \quad (5c)$$

This system has been used for the electrochemical degradation of pollutants (methanol) in water, see A. Lopez-Lopez, E. Exposito, J. Anton, F. Rodriguez-Valera, A. Aldaz, Biotechnology and Bioengineering, 63 (1999) 79-86.

No literature data has been found describing a fuel cell for the production of electricity, based on the cathodic reduction of ferric to ferrous ions, coupled with the microbial regeneration of ferric ions by the oxidation of ferrous ions. The above analysis of the energetics of ferrous iron oxidation by *A. ferroxidans* shows that up to 90% of the Gibbs energy of microbial oxygen reduction can be used for the iron oxidation, i.e. production of electricity, while the rest will be consumed by the microorganisms for maintenance and formation of new cell biomass. It has also been found that the growth of *A. ferroxidans* can be uncoupled from iron oxidation under certain conditions, see M. Nemati, S. T. L. Harrison, G. S. Hansford, C. Webb, Biochemical Engineering Journal, 1 (1998) 171-190, i.e. these microorganisms can oxidize ferrous iron under zero-growth conditions.

It has been recognized that the global warming, caused mainly by anthropogenic carbon dioxide emissions, is one of the main problems which humanity faces at the moment. Presently, the most promising way to reduce the release of carbon dioxide to atmosphere seems to be the transition from fossil fuel economy to hydrogen economy, see J. O. M. Bockris, International Journal of Hydrogen Energy, 27 (2002) 731-740.

Presently known oxygen/hydrogen fuel cells do not produce carbon dioxide when using hydrogen as fuel. However, it would be even more advantageous to provide a bio-fuel cell based on chemolithotrophic microorganisms such as *Acidithiobacillus ferroxidans* which exhibit very high efficiency and which consumes $CO_2$ from atmosphere during its operation.

SUMMARY OF INVENTION

An object of the present invention is to provide a redox fuel cell with an efficient method for the oxidant regeneration and which consumes $CO_2$.

In a preferred embodiment of the invention there is provided a bio-fuel cell based on the cathodic reduction of ferric to ferrous ions, coupled with the microbial regeneration of ferric ions by the oxidation of ferrous ions, with fuel (such as hydrogen) oxidation on the anode. The microbial regeneration of ferric ions is achieved by chemolithotrophic microorganisms such as *Acidithiobacillus ferroxidans*.

In one aspect of the invention there is provided a method for concurrent production of electrical power and biomass, and consumption of carbon dioxide ($CO_2$), comprising;

a) pumping a fluid containing oxygen and carbon dioxide into a cathode compartment, the cathode compartment including a cathode electrode and a redox couple with a reaction at the cathode electrode being reduction of a first member of the redox couple to a second member of the redox couple in a lower oxidation state;

b) pumping fuel into an anode compartment containing an anode electrode with the fuel having a hydrogen constituent, said anode compartment being separated from said cathode compartment by a proton exchange membrane, a reaction at the anode electrode being electrochemical oxidation of at least the hydrogen constituent of the fuel to produce electrons ($e^-$) and protons ($H^+$), wherein protons ($H^+$), formed by the oxidation of the fuel cross the proton exchange membrane into the cathode compartment;

c) providing dissolved nutrient salts to facilitate growth of chemolithotrophic microorganisms; and d) oxidizing the second member of the redox couple in the lower oxidation state back to the higher oxidation state by chemolithotrophic microorganisms in the presence of oxygen, wherein biomass production and carbon dioxide consumption responsively occurs due to fixation of the carbon dioxide by the chemolithotrophic microorganisms in the presence of the dissolved nutrient salts and the second member of the redox couple in the lower oxidation state; and wherein electrical power is obtained by making electrical connection between an electrical load and the anode and cathode electrodes.

In another aspect of the present invention there is provided a bio-fuel cell system, comprising;

a) a cathode compartment containing a cathode electrode, a pump for pumping a fluid containing oxygen and carbon dioxide into the cathode compartment;

b) an anode compartment containing an anode electrode with a fuel having a hydrogen constituent being pumped into said anode compartment, said anode compartment being separated from said cathode compartment by a membrane permeable to protons, a reaction at the anode electrode being electrochemical oxidation of the fuel to produce electrons ($e^-$) and protons ($H^+$), wherein protons (H+), formed by the oxidation of the fuel cross, wherein protons (H+), formed by the oxidation of the fuel cross the membrane into the cathode compartment; and c) chemolithotrophic microorganisms immobilized on said cathode electrode, an aqueous solution containing substantially no iron, coating said chemolithotrophic microorganisms for maintaining a suitable humidity of the microbial cells, wherein a reaction at the cathode electrode is biological reduction of oxygen at the cathode electrode in a reaction given by $O_2+4H++4e-=2H_2O$, wherein electrons in that reaction are obtained by transfer from the cathode electrode to the attached microbial cells, wherein electrical power is obtained by making electrical connection between a load and the anode and cathode electrodes.

In another aspect of the invention there is provided a bio-fuel cell system, comprising;

a) a fuel cell including a cathode compartment containing a cathode electrode, the cathode electrode including an Fe-copolymer containing a redox couple ($Fe^{2+}/Fe^{3+}$), chemolithotrophic microorganisms being immobilized on the Fe-copolymer, with a reaction at the cathode electrode being reduction of ferric ions at the cathode electrode in a reaction given by $4Fe^{3+}+4e^-=4Fe^{2+}$, a pump for pumping a fluid containing oxygen ($O_2$) and carbon dioxide ($CO_2$) into the cathode compartment; and b) an anode compartment containing an anode electrode with a fuel having a hydrogen constituent being pumped into said anode compartment, said anode compartment being separated from said cathode compartment by a membrane permeable to protons, a reaction at the anode electrode being electrochemical oxidation of the fuel to produce electrons ($e^-$) and protons ($H^+$), wherein protons (H+), formed by the oxidation of the fuel cross the membrane into the cathode compartment, and wherein the ferrous ions are oxidized by the chemolithotrophic microorganisms to ferric ions ($Fe^{3+}$) in an aerobic oxidation reaction in the cathode compartment given by $4Fe^{2+}+4H^++O_2=4Fe^{3+}+2H_2O$, wherein electrical power is obtained by making electrical connection between a load and the anode and cathode electrodes.

The bioreactor and the cathode compartment may contain dissolved nutrients for facilitating growth of the chemolithotrophic microorganisms.

The present invention also provides a bio-fuel cell system, comprising;

a) a cathode compartment containing a cathode electrode, chemolithotrophic microorganisms being immobilized on the cathode and in contact with an aqueous solution containing a salt of iron, with a reaction at the cathode electrode being reduction of ferric ions at the cathode electrode in a reaction given by $4Fe^{3+}+4e^-=4Fe^{2+}$, a pump for pumping a fluid containing oxygen ($O_2$) and carbon dioxide into the cathode compartment; and b) an anode compartment containing an anode electrode with a fuel having a hydrogen constituent being pumped into said anode compartment, said anode compartment being separated from said cathode compartment by a membrane permeable to protons, a reaction at the anode electrode being electrochemical oxidation of the fuel to produce electrons ($e^-$) and protons ($H^+$), wherein protons (H+) formed by the oxidation of the fuel cross the membrane into the cathode compartment, and wherein the ferrous ions ($Fe^{2+}$) are oxidized by the chemolithotrophic microorganisms to ferric ions ($Fe^{3+}$) in an aerobic oxidation reaction in the cathode compartment given by $4Fe^{2+}+4H^++O_2=4Fe^{3+}+2H_2O$, wherein electrical power is obtained by making electrical connection between a load and the anode and cathode electrodes.

The bio-fuel cell system may be used for production of biomass by pumping carbon dioxide ($CO_2$) and oxygen into the chamber containing chemolithotrophic microorganisms. Thus both oxygen and carbon dioxide may be pumped into the fuel cell by pumping air into the apparatus.

Controlling a ratio of electrical production to biomass production can be achieved by varying microbial cultivation parameters including an electrical potential of the cathode electrode, or by varying the ratio of $Fe^{2+}/Fe^{3+}$ concentrations, or a combination of both.

The chemolithotrophic microorganisms may be *Acidithiobacillus ferroxidans*.

BRIEF DESCRIPTION OF DRAWINGS

The following is a description, by way of example only, of the biofuel cell constructed in accordance with the present invention, reference being had to the accompanying drawings, in which:

FIG. 6b shows an alternative embodiment of the bio-fuel cell of FIG. 6a;

FIG. 7b an alternative embodiment of the bio-fuel cell of FIG. 7a;

FIG. 8b an alternative embodiment of the bio-fuel cell of FIG. 8a.

DETAILED DESCRIPTION OF THE INVENTION

Figure 1:
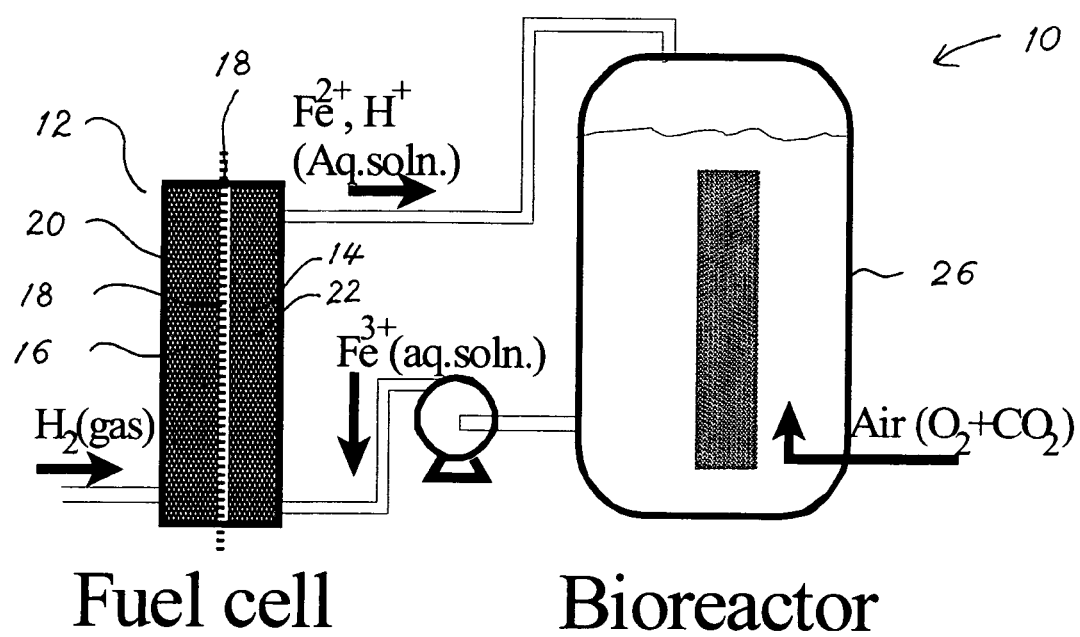
FIG. 1 shows a diagrammatic representation of a bio-fuel cell constructed in accordance with the present invention.

A preferred embodiment of a bio-fuel cell constructed in accordance with the present invention is based on the microbial oxidation of ferrous ions for the regeneration of the oxidant (ferric ions) in the fuel cell where the ferric iron are regenerated by *Acidithiobacillus ferroxidans* (*A. ferroxidans*) according to the reaction (1) above. Referring to FIG. 1, a bio-fuel cell-bioreactor system shown generally at 10 includes a fuel cell section 12 including a cathodic compartment 14 and an anodic compartment 16 separated by a membrane 18, such as for example a Nafion proton-exchange membrane. The anode 20 may be platinized carbon felt, while the cathode 22 may be a layer of carbon felt or some other inert material having a porous or otherwise high surface area. While the membrane is preferably a proton exchange membrane (PEM) other types of membranes may be used for separating physically the liquid in the cathode chamber from the gas (for example, hydrogen fuel) in the anodic space. For example, the membrane does not necessarily need to be a proton-exchange membrane, but may also be an inert membrane (plastic or inorganic material) with very fine pores (less than a micrometer), which just separates physically the anode and cathode spaces. Non-limiting examples include nitrocellulose membranes with a pore size below 0.2 micrometers; dialysis membranes; reverse osmosis membranes.

The cathode electrode is made from a chemically inert electrically conducting material such as carbon, nickel and stainless steel. It will be understood that the cathode may contain a catalyst which may be one of several catalysts, including minute amounts of gold, platinum, lead, palladium or other catalysts known to those skilled in the art.

A bioreactor 26 is in flow communication with the fuel cell section 12. A suitable bioreactor 26 which may be used has been disclosed in D. G. Karamanev, C. Chavarie, R. Samson, Biotechnology and Bioengineering, 57 (1998) 471-476 which discloses a design combining an airlift system and a fibrous immobilized microbial cell support. It had a total volume of 2.2 liters. In some embodiments, a inverse fluidized bed biofilm reactor may be used as disclosed in D. G. Karamanev, L. N. Nikolov, Environmental Progress, 15 (1996) 194-196.

The bioreactor 26 is used for the highly efficient oxidation of ferrous iron ions to ferric iron ions, i.e., for the oxidant regeneration. By definition, a bioreactor is a vessel in which microorganisms grow and perform biochemical reactions, such as in the present case ferrous iron oxidation. In studies to demonstrate the efficacy of the present biofuel cell, the bioreactor 26 was inoculated with $A.\ ferroxidans$ (10% v/v) isolated from a copper mine. The culture media was an aqueous solution containing 0.4 M ferrous ions as sulphate and the nutrient salt composition of Silverman and Lundgren having a pH of 1.8. Air with a flow rate of 200 L/h was sparged into the bioreactor 26 as a source of both oxygen and $CO_2$. After the cells of $A.\ ferroxidans$ were spontaneously immobilized on the surface of the fibrous support, the oxidation of ferrous ions was observed with a rate of 1.2 g per liter bioreactor volume per hour. Once 99% of ferrous ions in the bioreactor media were oxidized, the latter was circulated with a flow rate of 90 mL/h, using a peristaltic pump, through the cathodic compartment 14 of the fuel cell 10. The anodic compartment 16 was supplied with hydrogen at a rate of 0.3 mL/s, using a peristaltic pump (Cole-Parmer).

All the liquids which contact microrganisms (capillary or bulk, in the bioreactor or in the cathode compartment, containing iron or not) should also contain one or more dissolved nutrient salts to facilitate microbial growth. Preferred nutrient salts include: ammonium sulfate, potassium phosphate, magnesium sulfate, potassium chloride, calcium nitrate, calcium chloride, sulfuric acid. A typical composition of these salts is given by Silverman and Lundgren (J. of Bacteriology, v. 77, p. 642 (1959)).

The oxidation reaction of hydrogen at the anode:

$$2H_2 = 4H^+ + 4e^- \quad (6)$$

is coupled with the reduction of ferric ions at the cathode:

$$4Fe^{3+} + 4e^- = 4Fe^{2+} \quad (7)$$

The protons (H+), formed by reaction (6), cross the proton-conducting solid electrolyte 18 into the cathode compartment 14. The ferrous ions ($Fe^{2+}$), formed at the cathode, together with protons, are pumped to a bioreactor, where they are oxidized by microorganisms to ferric ions ($Fe^{3+}$) according to reaction (1), and then returned to the cathode compartment 14 of the fuel cell for the next cycle of electricity production. The overall reaction (chemical plus biochemical) taking place in the biofuel cell 10, can be obtained by summing the reactions 1, 6 and 7 which gives:

$$2H_2 + O_2 = 2H_2O \quad (8)$$

Therefore, the overall reaction in the biofuel cell 10 is the same as that in a hydrogen-oxygen fuel cell. The microorganisms plus the iron ions simply act as biocatalyst, which greatly increases the rate of the cathodic reaction. The ratio between the amount of energy used for electricity production and the amount of energy used for microbial growth can be easily controlled by varying cultivation conditions such as the ferric-to-ferrous iron concentration ratio in the bioreactor effluent. It is even possible to bring this ratio to infinity by uncoupling the microbial growth from ferrous iron oxidation. In that case no $CO_2$ is consumed and no biomass is produced.

Therefore, under ideal conditions (no energy loses in the cell), up to 90% of the Gibbs free energy of reaction (8) can be used for production of electricity while the remaining 10% will be used by microorganisms for $CO_2$ fixation resulting in biomass formation, as well as for cell maintenance. As mentioned above, the current fuel cells working on hydrogen and oxygen and using platinum as catalyst at both electrodes, have around 50% current efficiency. The rest is released as heat, which is often difficult to utilise. Using the same fuel and oxidant, the new biofuel cell will produce electricity and microbial mass.

Since the cathodic reaction (7) on a carbon electrode is much faster than oxygen reduction on a platinum electrode, and since the oxygen reduction rate is the limiting factor in the currently used fuel cells, the fuel cell disclosed herein will drastically improve both the economy and environmental effect of fuel cell operation due to the 1) increase in the current efficiency; 2) elimination the use of Pt at the cathode; 3) removal of carbon dioxide from atmosphere; and 4) production of potentially highly useful product, single-cell protein.

It has already been shown that $A.\ ferroxidans$ contains 44% protein, 26% lipids, 15% carbohydrates and at least two B-vitamins, see Tributsch, H, Nature, 281, 555 (1979). No negative physiological effect of this type of biomass are known, see Tributsch, H, Nature, 281, 555 (1979), but obviously, more research in this direction is needed.

Studies to characterize the bio-fuel cell 10 were conducted and for these all the potentials are given vs. the standard hydrogen electrode (SHE). The potentials were measured using an Orion pH-mV meter.

Figure 2:
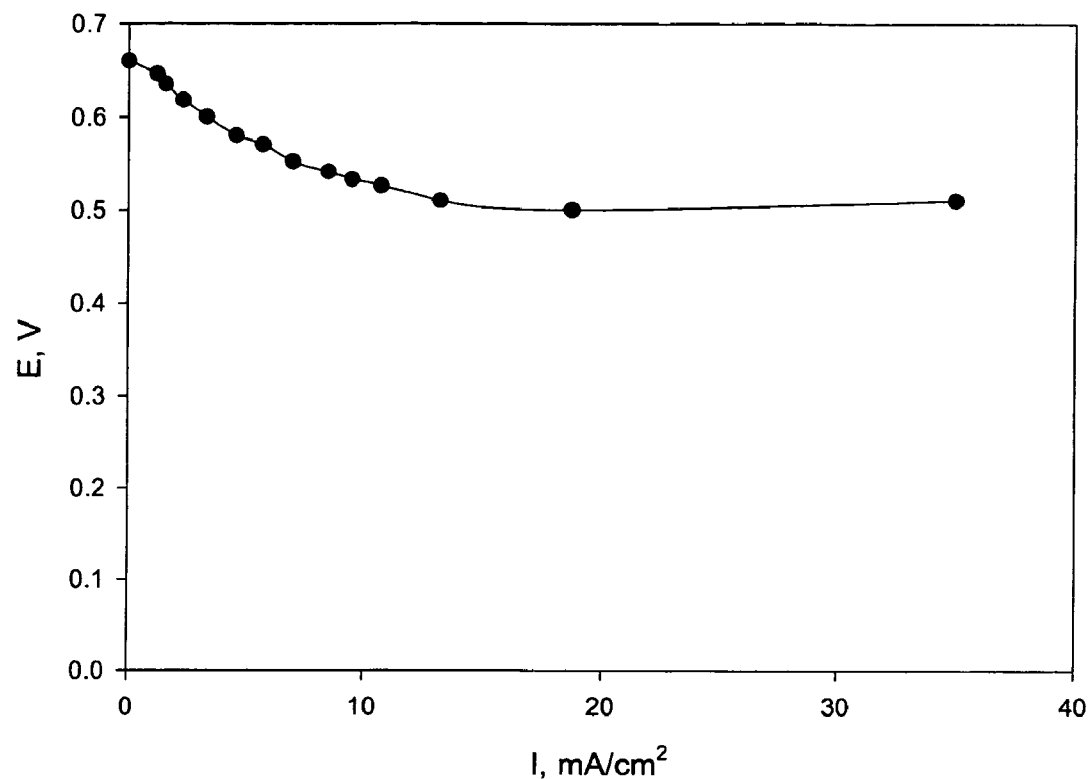
FIG. 2 is a plot of cathode potential versus current density achieved with the fuel cell of FIG. 1.

The bioreactor containing immobilized $A.\ ferroxidans$ was used to oxidize ferrous ions in batch regime. After reaching about 99% conversion of ferrous iron oxidation, the liquid phase was pumped from the bioreactor 26 to the cathode compartment 14 of the fuel cell. The relationship between the cathode potential and the current density is shown in FIG. 2. The total iron concentration was 0.4 M and pH was 1.8. It can be seen that while there was some drop in the cathode potential, it was 150 mV at a current density of 35 mA/cm². This potential drop was similar, and in some cases, smaller than that reported in literature on the electrochemical oxygen reduction on platinum.

Figure 3:
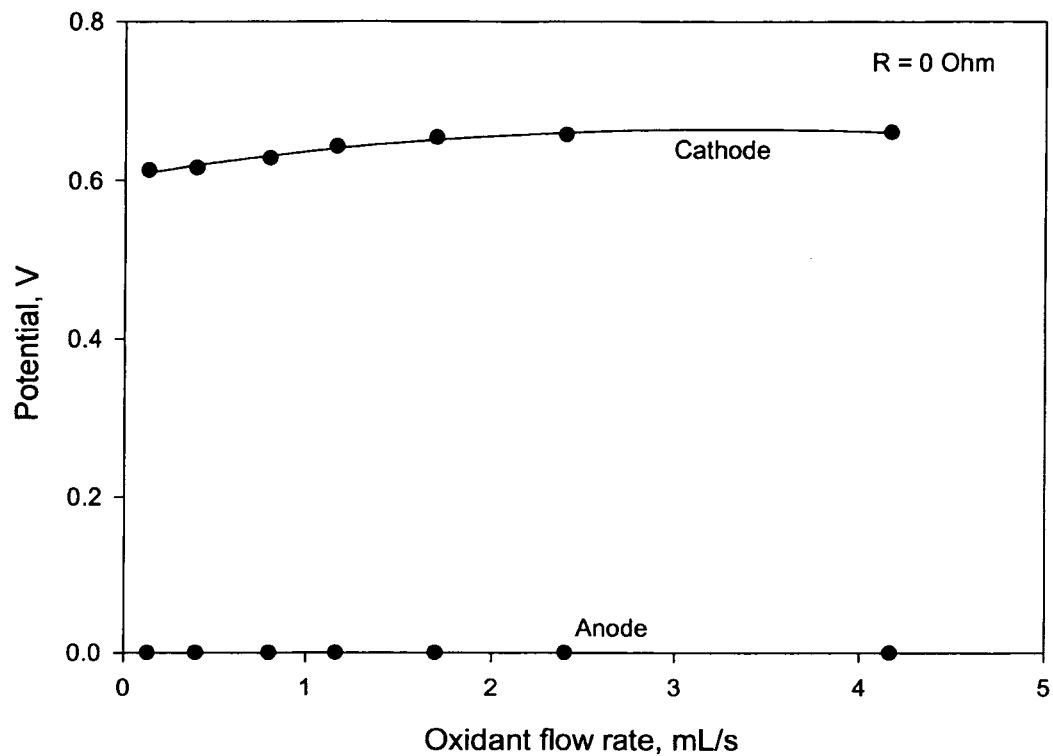
FIG. 3 is a plot of cathode potential versus oxidant flow rate into the cathode compartment of the fuel cell of FIG. 1.
Figure 4:
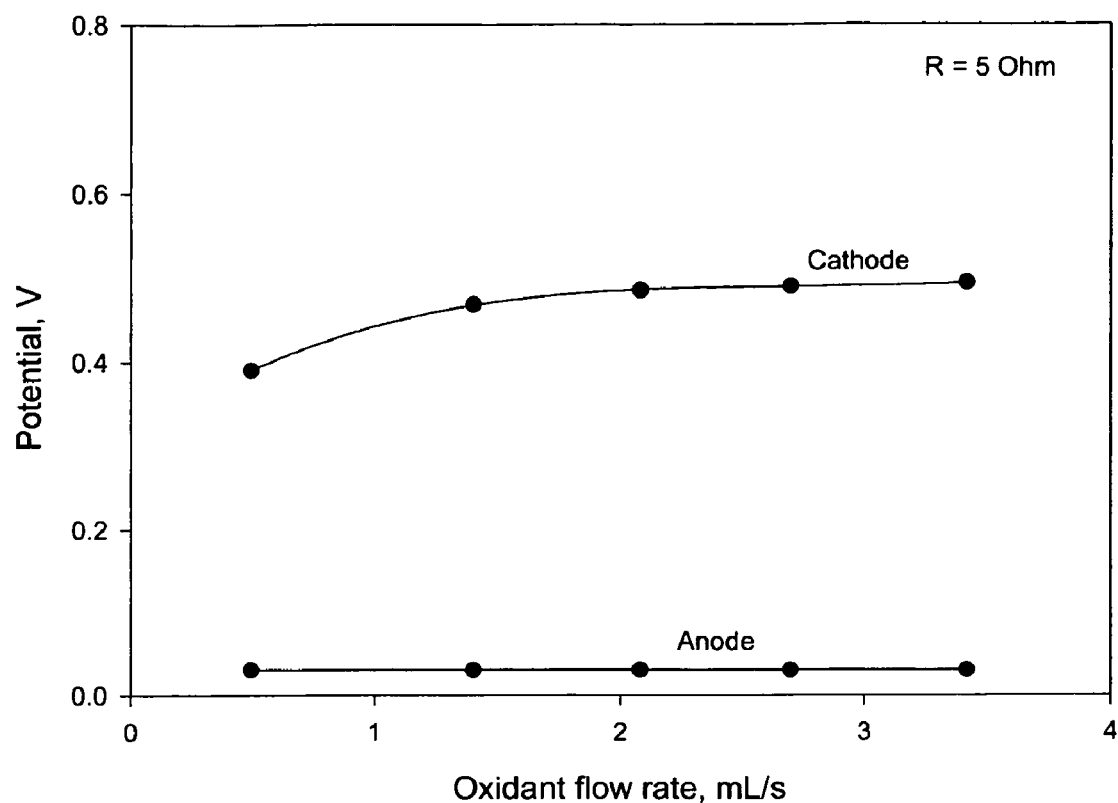
FIG. 4 is a plot of fuel cell potential versus oxidant flow rate into the cathode compartment of the fuel cell of FIG. 1.

The effect of the flow rate of liquid in the cathode compartment was also studied. The flow rate was varied between 0 and 4.2 mL/s. Two different electrical loads were used –0 and 5 Ohms. The results with nonelectrical load (0 Ohm) are shown in FIG. 3. It can be seen that there is only a small increase in the cell potential, from 610 mV to 661 mV, or less than 9%. All of the potential increase was due to the cathode, and no effect of the oxidant flow rate on the anode potential was observed (FIG. 3), which was expected. Theoretically, the flow rate should have no effect on the cell potential at zero load. The small variation (9%) observed is most probably due to the cross-current. The effect of the oxidant flow rate on the fuel cell voltage was also studied at a load of 5 Ohms. The results (FIG. 4) show that the effect is more significant than in the case of 0 Ohm load. When the flow rate was increased from 0.5 to 3.4 mL/s, the total cell voltage first increased sharply, and then leveled off. The total increase was 30%. These results show that there are some mass transfer limitations of the oxidant at lower flow rates, below 2 mL/s. At flow rates, higher that this value, no mass transfer limitation was observed.

Figure 5:
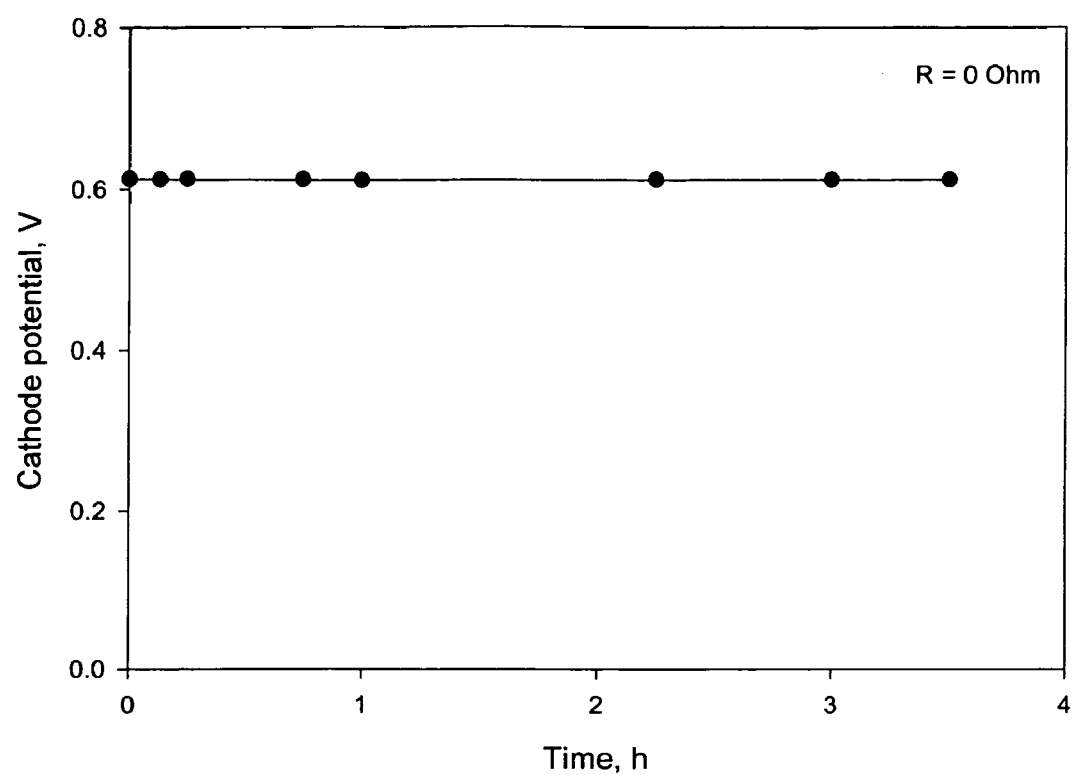
FIG. 5 is a plot of cathode potential versus time for extended operation of the fuel cell of FIG. 1.

The stability of the biofuel cell during several hours of operation was also studied. It was found out (FIG. 5) that the voltage-current characteristics did not change significantly during a period of 3.5 hours.

Advantageously, in addition to producing electricity, the fuel cell, shown in FIG. 1, is unique in that it transforms $CO_2$ into cellular biomass. Therefore, the fuel cell consumes $CO_2$ from atmosphere during its operation and produces microbial mass, which can be used as single-cell protein (SCP). It has already been shown that *A. ferroxidans* contains 44% protein, 26% lipids, 15% carbohydrates and at least two B-vitamins, see Tributsch, H, *Nature,* 281, 555 (1979), which makes it potentially an excellent animal feed. No negative physiological effect of this type of biomass are known as discussed by Tributsch. It should be noted that the produced single-cell protein is practically free from both toxic chemicals and pathogens. In the present SCP technologies, toxic chemicals can be found in the case when methanol is used as a substrate, see Ravindra, A. P., *Biotech. Adv.,* 18, 459 (2000). Microbial contamination (which is sometimes toxic) is eliminated in our technology because there are no known pathogenic microorganisms growing on completely inorganic medium containing high concentrations of iron sulfate at pH between 1 and 2. The microbial contamination is a problem in many of the present methods for SCP production as discussed in Ravindra, A. P., *Biotech. Adv.,* 18, 459 (2000).

The biofuel cell system 10 of FIG. 1 requires streams of hydrogen, oxygen and carbon dioxide. As a result of the electrobiochemical reactions, the biofuel cell produces electrical energy, heat, water (as vapour) and microbial cell mass. The hydrogen is injected into the anodic compartment of the fuel cell, while the oxygen and $CO_2$ are consumed and water and the biomass are produced in the bioreactor. In the industrial ferrous iron oxidation bioreactors, oxygen and carbon dioxide are supplied from the atmosphere.

The biofuel cell has the following characteristics, calculated on the basis of the mass balance, stoichiometry and kinetics: During the generation of 100 kW of electrical energy: 4 kg/h $H_2$ and 4 kg/h $CO_2$ are consumed; 9 kg/h biomass (SCP) are produced; and 10 $m^3$ bioreactor is preferred. The major advantages of the proposed biofuel cell to the currently known types of fuel cells are: 1) high efficiency (80-90% vs. 50%, respectively); no need for noble-metal cathodes; and the unique feature of the biofuel cell is the consumption of carbon dioxide during its operation production of potentially highly useful product, single-cell protein (SCP).

The energy released by the overall chemical reaction $2H_2+O_2=2H_2O$ is used for the formation of three products: electricity generation, single cell protein (SCP) biomass production and heat generation. It is possible to operate the fuel cell in such a manner that the ratio between the production of electricity and production of SCP be set at any value between 0 and infinity, i.e. between "production of only biomass and no electricity" and "production of no biomass and only electricity". The electrons required for the SCP production can come either from the reaction $2H_2+O_2=2H_2O$, or directly from electrical current (microorganisms consume electrons from a cathode). The ratio of SCP/electricity can be controlled by either varying the potential of the cathode or by varying the cultivation conditions such as the ratio of $Fe^{2+}/Fe^{3+}$ concentrations. Accordingly, the bio-fuel cell of the present invention can include means for applying and controlling a voltage on the cathode electrode for controlling a ratio of electrical production to single-cell protein production by varying microbial cultivation parameters. The bio-fuel cell according to the invention can also include means for controlling a ratio of $Fe^{2+}/Fe^{3+}$ concentrations for varying microbial cultivation parameters in order to control a ratio of electrical production to single-cell protein production. Furthermore, the bio-fuel cell can also include means for controlling concentrations of the dissolved nutrients concentrations for varying microbial cultivation parameters in order to control a ratio of electrical production to single-cell protein production.

The embodiment of the bio-fuel cell 10 shown in FIG. 1 is such that the oxidation of ferrous iron is performed in an external bioreactor; and the reduced form of iron (ferrous ions) is pumped back to the bioreactor. In an alternative embodiment the bioreactor and the cathode compartment may be incorporated together as one unit. The microorganisms are immobilized on the surface of the cathode (such as carbon fibre). They are surrounded by capillary solution, containing iron salts (for example, iron sulfates, iron chlorides, iron nitrates and their complexes to mention just a few. A gas containing oxygen and carbon dioxide (air) is pumped to the cathode compartment space. The air dissolves in the liquid, thus supplying the microorganisms with oxygen and carbon dioxide. The scheme of this version of the biofuel cell is shown in FIG. 6a.

Figure 6A:
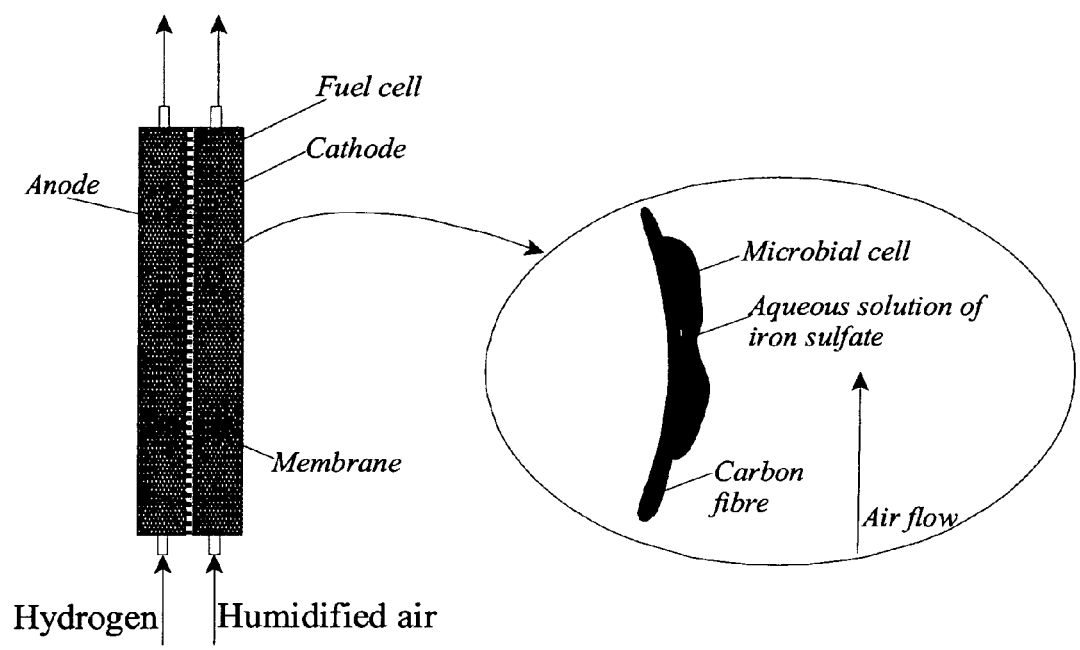
FIG. 6a shows an alternative embodiment of a bio-fuel cell constructed in accordance with the present invention.
Figure 6B:
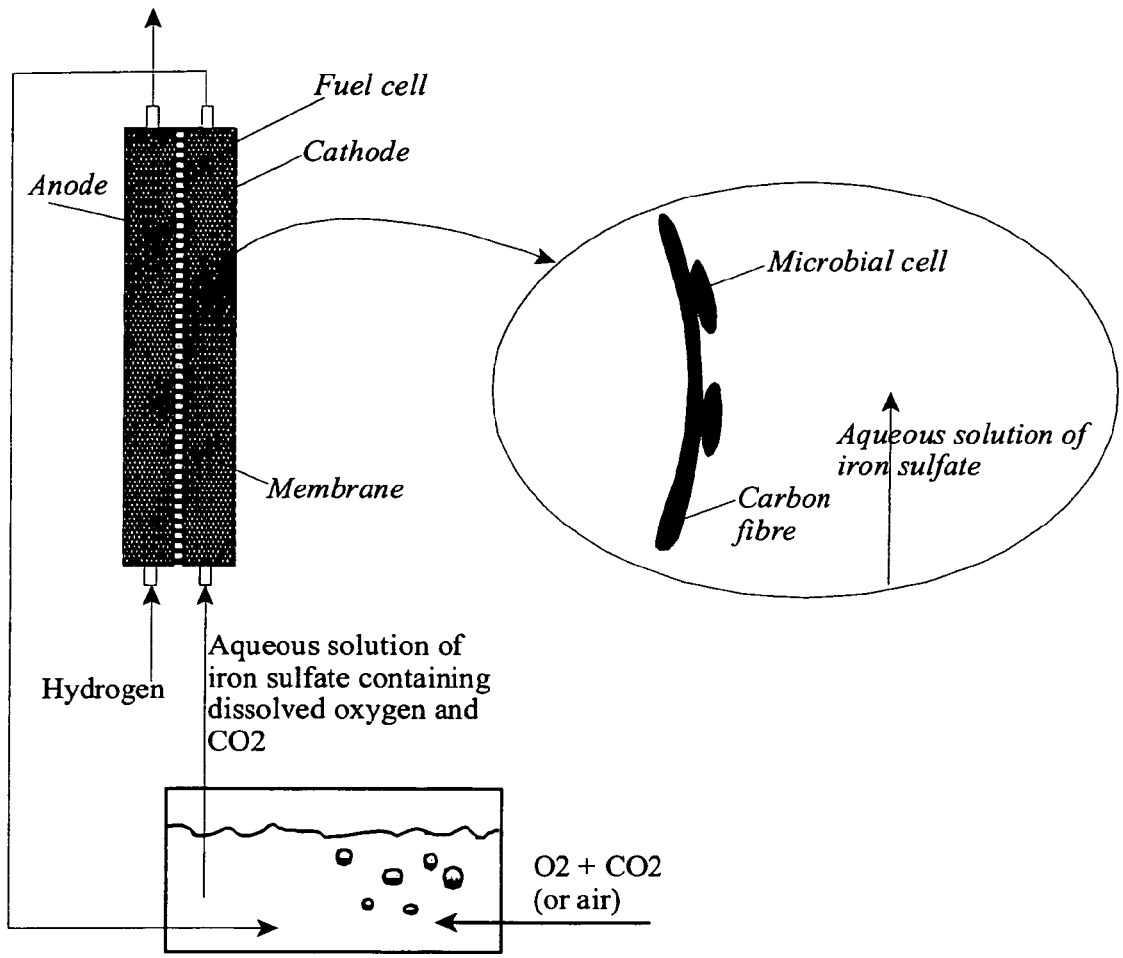

FIG. 6b shows a variation of the embodiment of FIG. 6a in which the microorganisms are attached to the cathode and cathode chamber is flooded with an aqueous solution containing an iron salt which circulates between the cathode chamber and a vessel, where $O_2$ and $CO_2$ are dissolved in it by gas (air) bubbling or other means such as spraying the liquid.

Figure 7A:
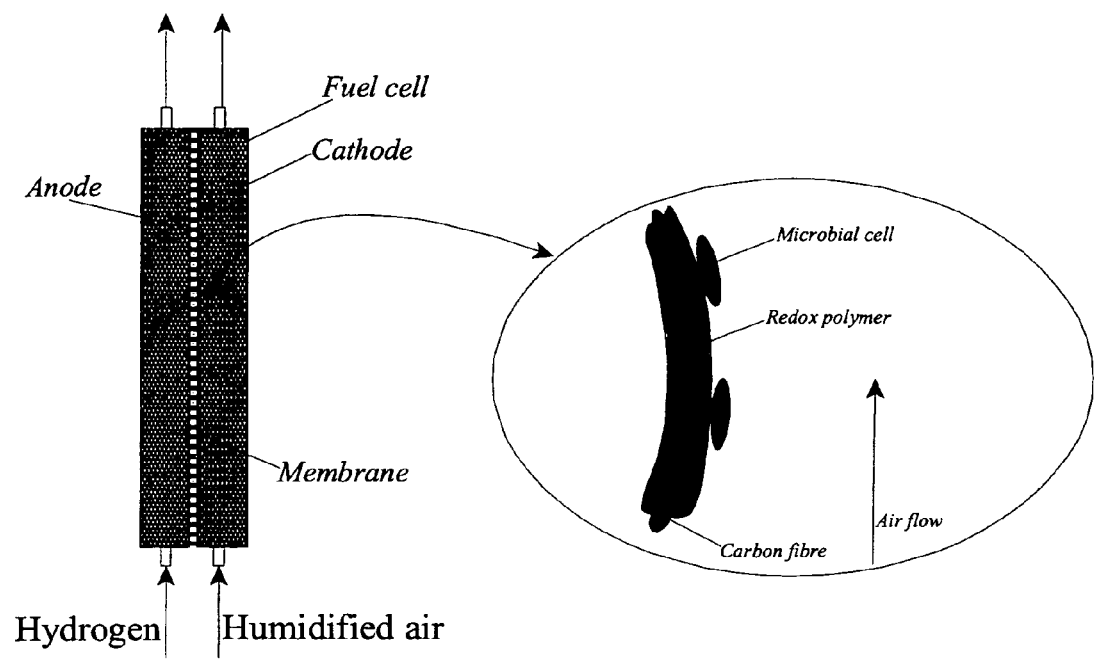
FIG. 7a shows another alternative embodiment of a bio-fuel cell.

In another embodiment, shown in FIG. 7a, the redox couple (Fe2+/Fe3+) is in a solid form. The microorganisms are immobilized on the surface of an insoluble electron-exchanger such as redox polymer, which covers the surface of the cathode. Exemplary non-limiting Fe-copolymers that may be used are disclosed in A. Aoki and T. Miyashita, *J. Electroanal. Chem.,* 473, 125-131 (1999).

Figure 7B:
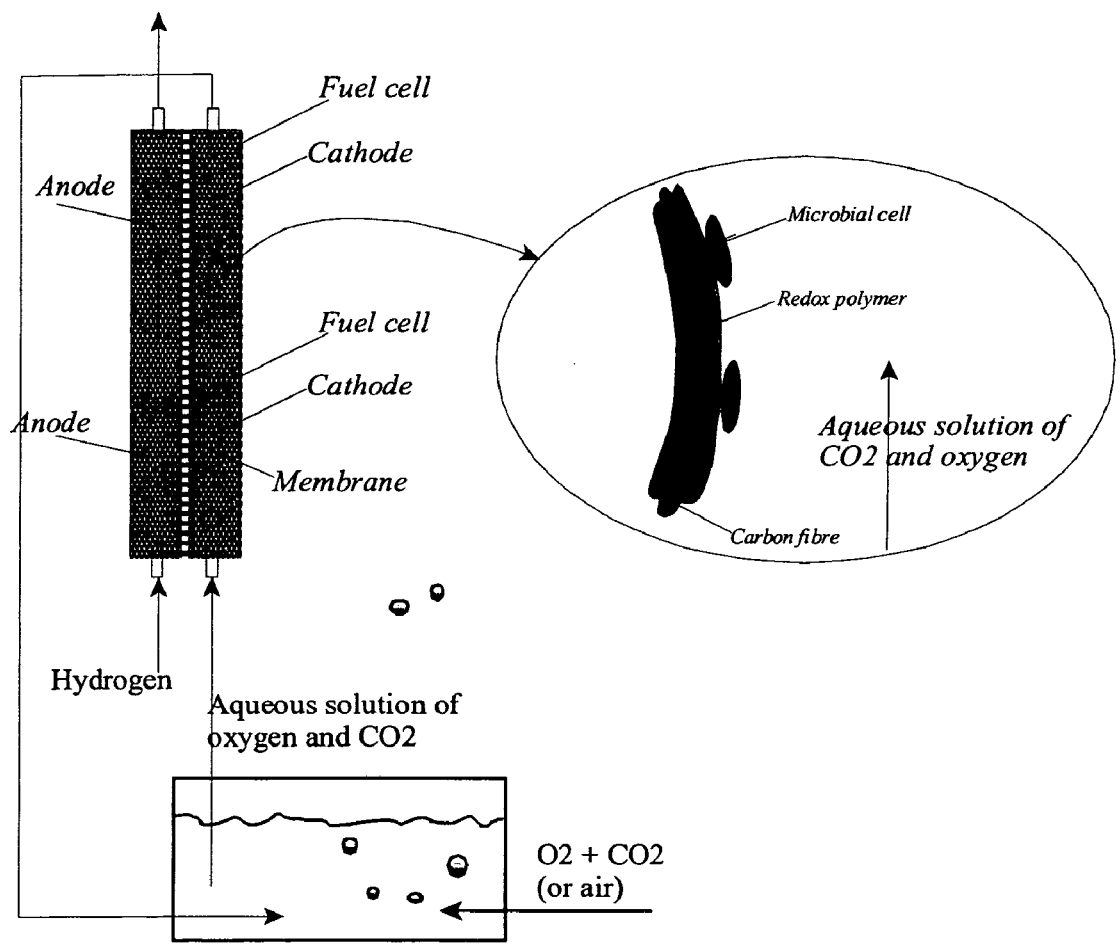

FIG. 7b shows a variation of the embodiment of FIG. 7a in which again the microorganisms are immobilized on the surface of an insoluble electron-exchanger such as redox polymer, which covers the surface of the cathode and an aqueous solution circulates between the cathode chamber and a vessel, where $O_2$ and $CO_2$ are dissolved in the aqueous solution by gas (air) bubbling or other means such as spraying the liquid.

Figure 8A:
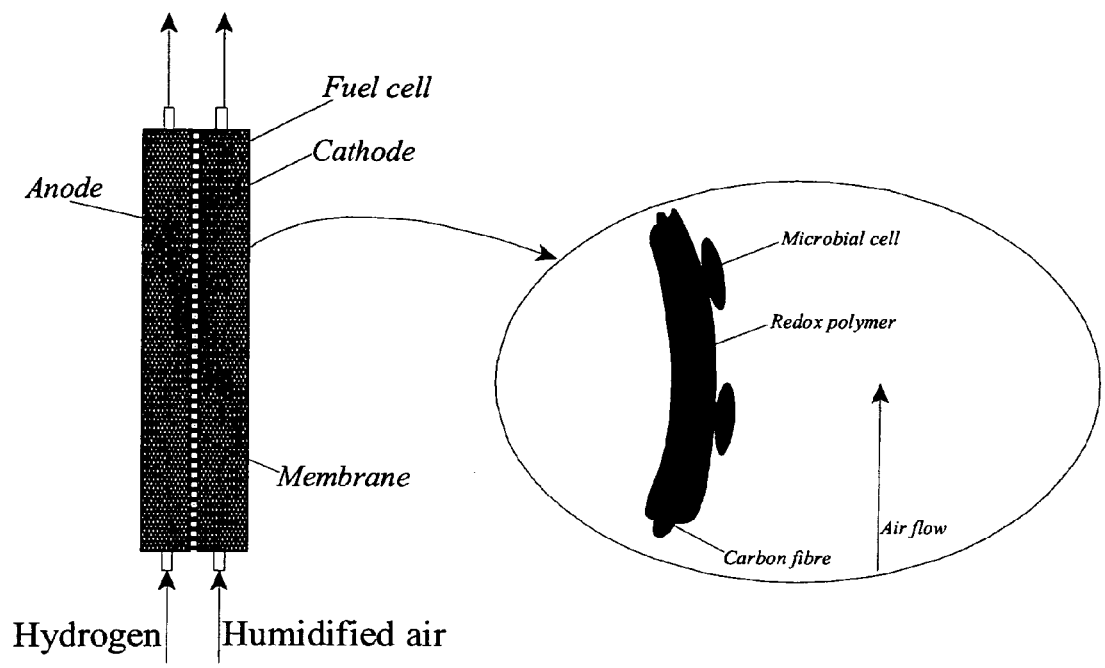
FIG. 8a shows another alternative embodiment of a bio-fuel cell.

In another embodiment of the bio-fuel cell, shown in FIG. 8a, the microbial cells are attached directly on the surface of the cathode, and there is no redox couple. The cells draw electrons directly from the cathode. The humidity of the microbial cells is maintained by a capillary layer of an inorganic salt solution, such as that disclosed in Silverman, M. P. and D. G. Lundgren, *J. Bacteriol.,* 77, 642 (1959), containing no iron salts.

Figure 8B:
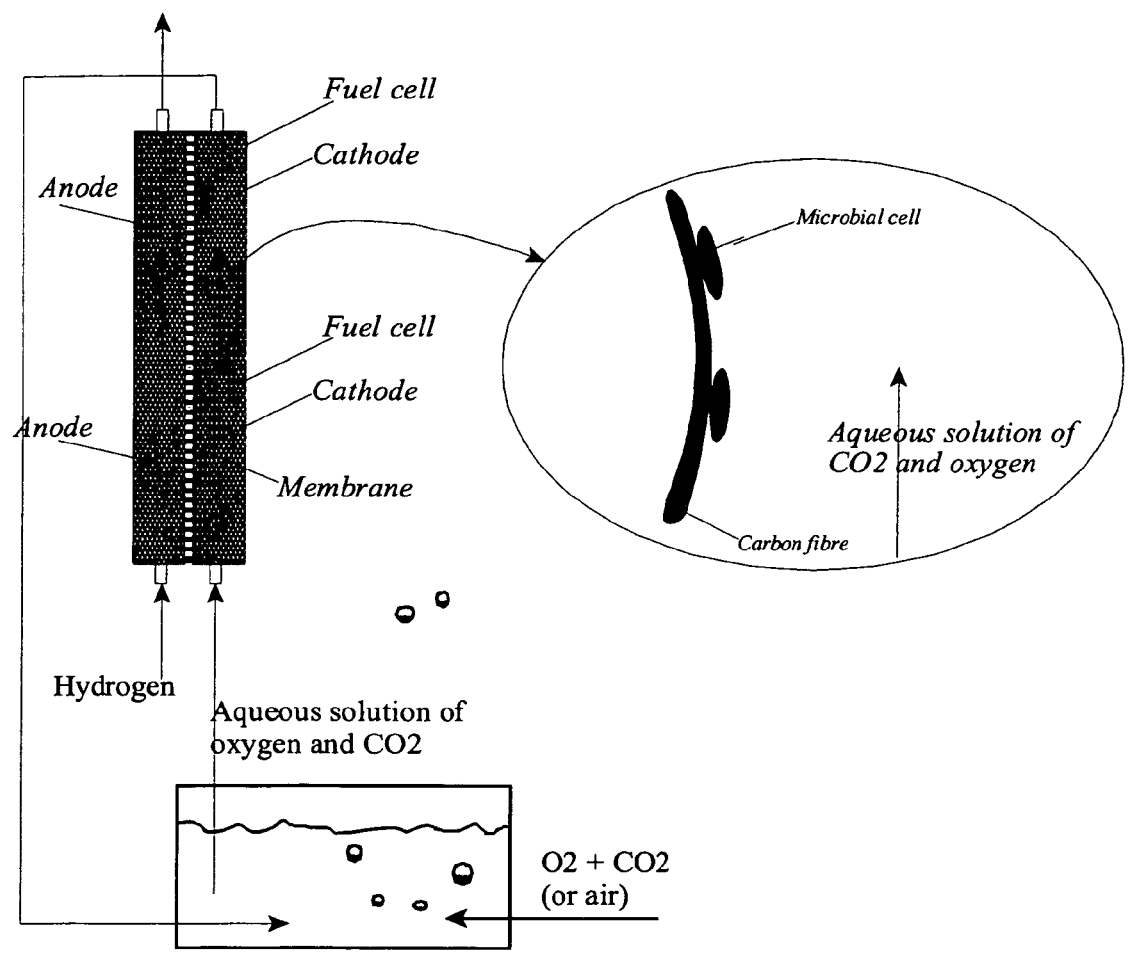

FIG. 8b shows a variation of the embodiment of FIG. 7a in which again the microorganisms are immobilized on directly on the surface of the cathode and an aqueous solution circulates between the cathode chamber and a vessel, where $O_2$ and $CO_2$ are dissolved in the aqueous solution by gas (air) bubbling or other means such as spraying the liquid. In the case when microorganisms are immobilized on the cathode, it is necessary to add an inert substance which promotes the microbial immobilization. Example: powder or gel of silicon dioxide; aluminum oxide; water-insoluble silicates; calcium sulfate, just to mention a few.

It will be understood that the present invention is not restricted to only gaseous hydrogen/oxygen fuel cells using gaseous hydrogen fuel but may use other hydrogen containing fuels which can undergo electrochemical oxidation, for example methanol, ethanol, methane to mention just a few. For example, the anodic reaction in the case of methanol fuel is:

$$CH_3OH+H_2O=CO_2+6H^++6e-$$

The hydrogen ions again cross the membrane, and the rest of the fuel cell, as well as the biofuel cell system is the same as in the case of biofuel cell using gaseous $H_2$ fuel.

The anodic reaction of methane as a fuel is:

$$CH_4+O_2=CO_2+4H^++4e-$$

In the case of ethanol as a fuel, the anodic reaction is:

$$C_2H_5OH+3H_2O=2CO_2+12H^++12e-$$

Thus in alternative embodiments of the biofuel cell, the fuel may be a compound having a hydrogen constituent (either the only constituent in the case of hydrogen gas or one of several constituents in the case of a compound) and electrochemical oxidation of the fuel produces protons and electrons as with the oxidation of hydrogen but may include other products as well, and the fuel is pumped into the anode compartment in a fluid which may be in the form of a gas or liquid.

In addition, while a preferred chemolithotrophic microorganism for use in the biofuel cell disclosed herein is *Acidithiobacillus ferroxidans* it will be understood that other microorganisms may be used, for example *Leptospirillum ferroxidans, Acidimicrobium, Alicyclobacillus* and *Sulfobacillus*, to mention just a few. These microorganisms work in substantially the same way as *Acidithiobacillus ferroxidans*. Other microorganisms which work in the same way will be known to those skilled in the art and are contemplated by the inventor to be useful in the present invention.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A method for concurrent production of electrical power and biomass, and consumption of carbon dioxide ($CO_2$), comprising;
    a) pumping a fluid containing oxygen and carbon dioxide into a bioreactor containing chemolithotrophic microorganisms and dissolved nutrients to facilitate growth of the chemolithotrophic microorganisms, said bioreactor being in flow communication with a cathode compartment, the cathode compartment including a cathode electrode and a redox couple $Fe^{2+}/Fe^{3+}$ with a reaction at the cathode electrode being reduction of a first member $Fe^{3+}$ of the redox couple to a second member $Fe^{2+}$ of the redox couple in a lower oxidation state with a chemical reaction being $4Fe^{3+}+4e^-=4Fe^{2+}$;
    b) pumping fuel into an anode compartment containing an anode electrode with the fuel having a hydrogen constituent, said anode compartment being separated from said cathode compartment by a proton exchange membrane, a reaction at the anode electrode being electrochemical oxidation of at least the hydrogen constituent of the fuel to produce electrons ($e^-$) and protons ($H^+$), wherein protons ($H^+$) formed by the oxidation of the fuel cross the proton exchange membrane into the cathode compartment;
    c) pumping an aqueous solution containing ferrous ions ($Fe^{2+}$) and protons ($H^+$) from the cathode compartment to the bioreactor where the ferrous ions ($Fe^{2+}$) are oxidized by the chemolithotrophic microorganisms to ferric ions ($Fe^{3+}$) in an aerobic oxidation reaction given by $4Fe^{2+}+4H^+O_2=4Fe^{3+}+2H_2O$, wherein biomass production and carbon dioxide consumption responsively occurs due to fixation of the carbon dioxide ($CO_2$) by the chemolithotrophic microorganisms in the presence of the dissolved nutrient salts and the $Fe^{2+}$; and
    d) pumping the aqueous solution containing the $Fe^{3+}$ oxidized by the chemolithotrophic microorganisms in said bioreactor into said cathode compartment;
    wherein electrical power in an electrical load is obtained by making electrical connection between the electrical load and the anode and cathode electrodes.

2. The method according to claim 1, wherein the chemolithotrophic microorganisms are *Acidithiobacillus ferroxidans*.

3. The method according to claim 1, wherein the chemolithotrophic microorganisms are selected from the group consisting of *Leptospirillum ferroxidans, Acidimicrobium, Alicyclobacillus*, and *Sulfobacillus*.

4. The method according to claim 1, wherein the fuel having a hydrogen constituent is selected from the group consisting of hydrogen gas, methanol, and ethanol.

5. The method according to claim 4 wherein the fuel having a hydrogen constituent is hydrogen gas, and wherein the electrochemical oxidation reaction is oxidation of hydrogen at the anode electrode in a reaction given by $2H_2=4H++4e-$, and so that an overall bio-fuel cell reaction is given by $2H_2+O_2=2H_2O$.

6. The method according to claim 1, including controlling a ratio of electrical production to biomass production by varying microbial cultivation parameters including an electrical potential of the cathode electrode, or by varying the ratio of $Fe^{2+}/Fe^{3+}$ concentrations, or a combination of both.

7. The method according to claim 1 including applying and controlling a voltage on the cathode electrode for controlling a ratio of electrical production to biomass production by varying microbial cultivation parameters.

8. The method according to claim 1 including controlling a ratio of $Fe^{2+}/Fe^{3+}$ concentrations for varying microbial cultivation parameters in order to control a ratio of electrical production to biomass production.

9. The method according to claim 1 including controlling concentrations of the dissolved nutrients concentrations for varying microbial cultivation parameters in order to control a ratio of electrical production to biomass production.

10. The method according to claim 1, wherein the dissolved nutrients are one or more of ammonium sulfate, potassium phosphate, magnesium sulfate, potassium chloride, calcium nitrate, calcium chloride and sulfuric acid.

11. The method according to claim 1, wherein the cathode electrode is made from a chemically inert electrically conducting material.

12. The method according to claim 11 wherein the cathode electrode includes a layer of a porous or fibrous material selected from the group consisting of carbon, nickel and stainless steel.

13. The method according to according to claim 11 wherein the cathode electrode includes a solid plate of a material selected from the group consisting of carbon, nickel and stainless steel.

14. The method according to according to claim 11, wherein the cathode electrode includes a catalyst.

15. The method according to according to claim 14 wherein the catalyst is one of gold, platinum, palladium and lead.

16. The method according to according to claim 1 wherein the biomass is single-cell protein.

* * * * *